United States Patent [19]
Matsuda

[11] Patent Number: 6,149,249
[45] Date of Patent: Nov. 21, 2000

[54] BRAKE SYSTEM FOR VEHICLE

[75] Inventor: Shohei Matsuda, Wako, Japan

[73] Assignee: Honda Giken Kogyo Kabushiki Kaisha, Tokyo, Japan

[21] Appl. No.: 09/095,606

[22] Filed: Jun. 11, 1998

[30] Foreign Application Priority Data

Jun. 12, 1997 [JP] Japan .................................... 9-154803

[51] Int. Cl.[7] .................................................. B60T 8/42
[52] U.S. Cl. ..................... 303/115.2; 303/114.1
[58] Field of Search ........................... 303/115.1, 116.1, 303/116.2, 115.5, 115.4, DIG. 11, 114.1

[56] References Cited

U.S. PATENT DOCUMENTS

| | | | |
|---|---|---|---|
| 4,523,792 | 6/1985 | Belart et al. | 303/115.1 |
| 5,188,439 | 2/1993 | Burgdorf et al. | 303/115.1 |
| 5,209,553 | 5/1993 | Burgdorf et al. | 303/116.1 |
| 5,251,971 | 10/1993 | Reinartz et al. | 303/116.1 |
| 5,288,142 | 2/1994 | Burgdorf | 303/DIG. 11 |
| 5,388,894 | 2/1995 | Holland et al. | 303/115.1 |

FOREIGN PATENT DOCUMENTS 8-18548   2/1996   Japan .

*Primary Examiner*—Michael Mar
*Assistant Examiner*—Devon Kramer
*Attorney, Agent, or Firm*—Arent Fox Kintner Plotkin & Kahn PLLC

[57] ABSTRACT

A brake system for a vehicle is provided which has liquid pressure supply units for outputting liquid pressure in response to braking operation, and wheel cylinders for braking wheels when actuated with supply of liquid pressure from the liquid pressure supply unit. The brake system is capable of actuating the wheel cylinders without delay despite a delay in the rise of the output liquid pressure of the liquid pressure supply units. The brake system has an accumulator, the output liquid pressure of which rises quicker than that of the liquid pressure supply unit, the output liquid pressure accumulated in the accumulator being supplied to the wheel cylinders with excellent response speed at the initial stage of braking operation.

12 Claims, 5 Drawing Sheets

6,149,249

BRAKE SYSTEM FOR VEHICLE

BACKGROUND OF THE INVENTION

1. Field of the Invention

The present invention relates to a vehicle brake system having liquid pressure supply units for outputting liquid pressure in response to a braking operation, and a wheel cylinder for braking a wheel upon receiving the liquid pressure from the respective liquid pressure supply unit.

2. Description of the Prior Art

A typical liquid pressure supply unit in a vehicle brake system comprises a vacuum or an electric booster, automatically actuated based on the signal output from an obstacle sensor for detecting an obstacle in the path of the vehicle or actuated by a driver, and a master cylinder which is driven by the booster and supplies liquid pressure to a wheel cylinder (e.g., Japanese Patent Publication No. 8-18548 (1996)).

However, there still exists the problem of causing an output delay of liquid pressure from the master cylinder, the problem arising from the time required to fill up an operating chamber of the booster with the pressurized operating liquid at the initial stage of braking operation, and from the ineffective stroke of the piston required to close the relief port of the master cylinder and so on.

SUMMARY OF THE INVENTION

An object of the present invention in view of the above situation, is to provide a brake system for a vehicle capable of actuating a wheel cylinder without delay, despite a delay in the rise of output liquid pressure of liquid pressure supply units actuated by the driver.

In order to accomplish this object, a brake system for a vehicle according to the present invention comprises a first liquid pressure supply unit for outputting liquid pressure in response to a braking operation, and a wheel cylinder operatively coupled to the first liquid pressure supply unit for braking a wheel when actuated with liquid pressure from the first liquid pressure supply unit. A second liquid pressure supply unit has the output liquid pressure which rises quicker than that of the first liquid pressure supply unit operatively coupled to the wheel cylinder, wherein the output liquid pressure of the second liquid pressure supply unit is selectively supplied to the wheel cylinder at the time of the braking operation.

With this arrangement, the wheel cylinder is supplied with the quick rising output liquid pressure by selectively operating the second liquid pressure supply unit, so that the wheel cylinder can be actuated with an excellent response speed, irrespective of the delay in the liquid pressure output from the first liquid pressure supply unit.

As a second feature of the present invention, the second liquid pressure supply unit is arranged so that it can accumulate the output liquid pressure of the first liquid pressure supply unit as its output liquid pressure. With this feature, the hydraulic oil pressure can be accumulated in the second liquid pressure supply unit without using a special liquid pressure pump.

As a third feature of the present invention, the first liquid pressure supply unit is arranged so that it can be actuated when no braking operation is conducted and the output liquid pressure of the first liquid pressure supply unit can then be accumulated in the second liquid pressure supply unit. With this arrangement, the output liquid pressure can be accumulated in the second liquid pressure supply unit by utilizing the first liquid pressure supply unit with efficiency, when no braking operation is conducted.

As a fourth feature of the present invention, the output liquid pressure of the second liquid pressure supply unit is supplied to the wheel cylinder at an initial stage of the braking operation. With this arrangement, since the second liquid pressure supply unit automatically operates at the initial stage of braking operation, the wheel cylinder can be actuated with excellent response speed, irrespective of the delay in the liquid pressure output from the first liquid pressure supply unit.

As a fifth feature of the present invention, the output liquid pressure of the second liquid pressure supply unit is supplied to the wheel cylinder when the braking operation is conducted suddenly. With this arrangement, since the second liquid pressure supply unit automatically operates at the time of sudden braking operation, the wheel cylinder can be actuated quickly and strongly.

As a sixth feature of the present invention, valve means is provided for selectively coupling the second liquid pressure supply unit and the wheel cylinder. With this arrangement, the valve means is selectively actuated to ensure that the liquid pressure is properly supplied to the wheel cylinder from the second liquid pressure supply unit.

As a seventh feature of the present invention, the second liquid pressure supply unit is an accumulator. With this arrangement, it is possible to employ a relatively inexpensive accumulator as the second liquid pressure supply unit.

DETAILED DESCRIPTION OF THE PREFERRED EMBODIMENT

Figure 1:
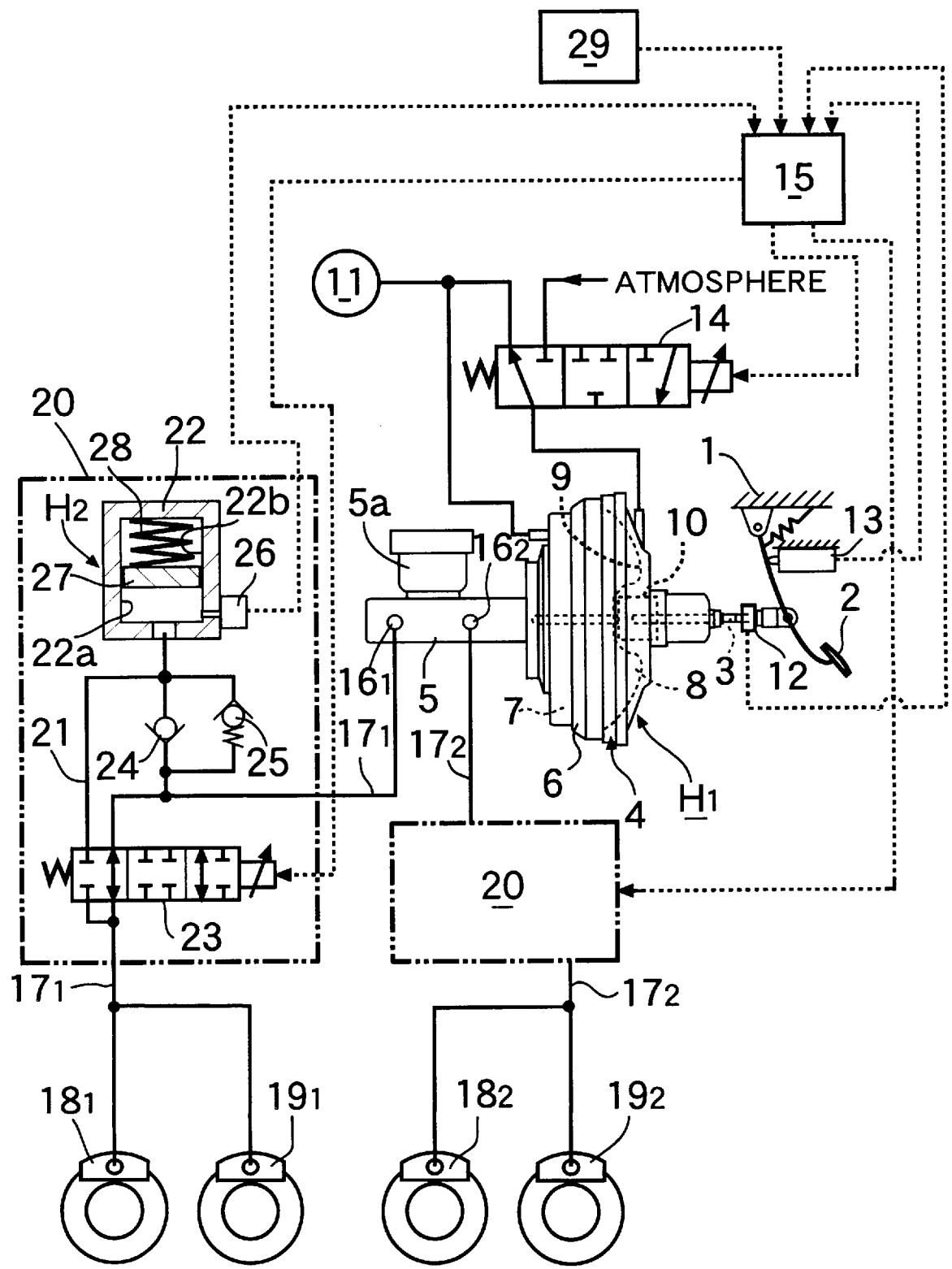
FIG. 1 is a schematic diagram of a brake system for an automobile of a first embodiment of the present invention.

As is heretofore well known, a vacuum booster 4 comprises a booster shell 6 secured to a vehicle body 1, a diaphragm piston 9 for partitioning the vacuum booster 4 into a front vacuum chamber 7 and a rear operating chamber 8, and a main control valve 10 for operatively coupling the operating chamber 8 with the atmosphere when an input lever 3 is moved forward and for operatively coupling the operating chamber 8 with the vacuum chamber 7 when it is moved backward. The vacuum chamber 7 is connected to a vacuum source 11 such as the intake manifold of an engine. A brake pedal 2 is provided with a brake operating switch 12 which is turned on when the brake pedal 2 is depressed and a brake operating rate switch 13 which is turned on when the depressing rate of the brake pedal 2 exceeds a predetermined value A.

When the brake pedal 2 is depressed to open the operating chamber 8 to the atmosphere, the atmospheric pressure is introduced into the chamber 8, and the pressure difference between the chamber 8 and the vacuum chamber 7 causes the diaphragm piston 9 to move forward and also causes a master cylinder 5 to be actuated. When the brake pedal 2 is released to couple the operating chamber 8 with the vacuum chamber 7, the pressure difference between chambers 7 and 8 is cancelled and the diaphragm piston 9 is moved backward by the urging force of a return spring (not shown), so that the master cylinder 5 is returned to an unoperated condition.

An electromagnetic sub-control valve 14 is connected to the operating chamber 8. The sub-control valve 14 has three switching positions: a left position where it couples the operating chamber 8 with the atmosphere; a right position where it couples the operating chamber 8 with the vacuum source 11; and a neutral position where the operating chamber 8 is not coupled to either the atmosphere or the vacuum source 11. In order to control the switching of these positions, an electronic control unit 15 is connected to the solenoid of the sub-control valve 14. In this case, signals that are inputted to the electronic control unit 15 include a signal to be outputted when an obstacle sensor 29 provided in a vehicle, detects an obstacle in the vehicle's path; a signal outputted from the brake operating switch 12; and a signal outputted from an accumulator switch 26 which will be described later. Consequently, by moving the sub-control valve 14 to the left or right using the output of the electronic control unit 15, it is possible to introduce the atmospheric pressure into the operating chamber 8, actuate the master cylinder 5 via the diaphragm piston 9 by means of the pressure difference between the chamber 8 and the vacuum chamber 7 or return the master cylinder 5 to the unoperated condition by cancelling the pressure difference therebetween.

The master cylinder 5 is of a tandem type having first and second output ports $16_1$ and $16_2$ for use in outputting braking oil pressure when the master cylinder 5 is actuated. A wheel cylinder $18_1$ of a left front wheel brake and a wheel cylinder $19_1$ of a right rear wheel brake are connected to an oil channel $17_1$ extending out of the first output port $16_1$, whereas a wheel cylinder $18_2$ of a right front wheel brake and a wheel cylinder $19_2$ of a left rear wheel brake are connected to an oil channel $17_2$ extending out of the second output port $16_2$.

As stated above, the vacuum booster 4, the master cylinder 5 and the sub-control valve 14 form a first liquid pressure supply unit $H_1$.

An auxiliary brake unit 20 is provided for the oil channels $17_1$, $17_2$. The auxiliary brake unit 20 comprises a path 21 for bypassing the intermediate portion of the corresponding oil channels $17_1$, $17_2$, an accumulator $H_2$ as a second liquid pressure supply unit connected to the path 21, a one-way valve 24 and a relief valve 25 juxtaposed to each other in parallel to the path 21 on the upstream side of the accumulator $H_2$, and an electromagnetic switching valve 23 installed between the oil channels $17_1$, $17_2$ on the downstream side of the path 21. The one-way valve 24 allows flow from the oil channel $17^1$ toward the accumulator $H_2$, and the relief valve 25 opens when the accumulating force of the accumulator $H_2$ reaches the predetermined maximum value or greater.

The accumulator $H_2$ has an accumulator cylinder 22 and an accumulator piston 27 for partitioning the inside into an accumulator chamber 22a and a spring chamber 22b. An accumulator spring 28 for urging the accumulator piston 27 toward the accumulator chamber 22a is accommodated in the spring chamber 22b, and the accumulator chamber 22a communicates with the path 21. When the piston of the master cylinder 5 is actuated with one full-stroke so as to store the output hydraulic oil pressure in the accumulator chamber 22a, the accumulating force can be set to a predetermined value P or greater. The accumulator $H_2$ is provided with the accumulator switch 26 which is turned on when the accumulating force reaches the predetermined value P or greater.

The switching valve 23 has three switching positions: a right position where the oil channels $17_1$, $17_2$ conduct while closing the path 21; a left position where the path 21 conducts while closing the oil channels $17_1$, $17_2$; and a neutral position where it simultaneously closes the path 21 and the oil channels $17_1$, $17_2$. In order to control the switching between these positions, the electronic control unit 15 is connected to the solenoid of the switching valve 23.

Figure 2:
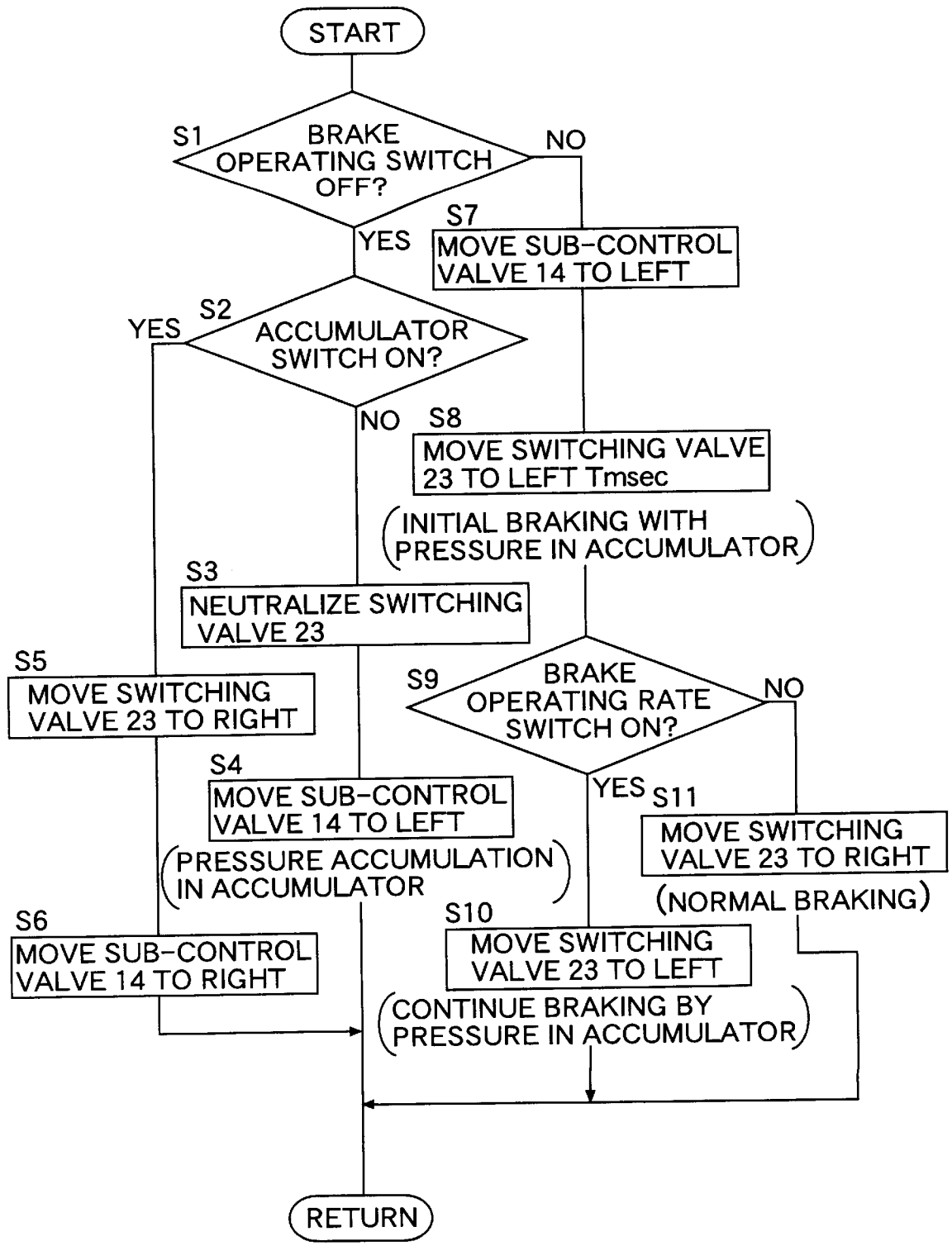
FIG. 2 is a flow chart showing procedures for controlling the brake system of FIG. 1.

The electronic control unit 15 controls the sub-control valve 14 and the switching valve 23 according to control procedures shown by the flow chart of FIG. 2.

While the brake pedal 2 is not depressed and the accumulating force of the accumulator $H_2$ remains at the predetermined value P or less, that is, if the accumulator switch 26 is held OFF, Step S3 follows Step S1 and Step S2 to hold the switching valve 23 in the neutral position and the sub-control valve 14 is moved to the left at Step S4. Consequently, the atmospheric pressure introduced into the operating chamber 8 causes the diaphragm piston 9 to advance forward so as to drive the master cylinder 5. Thus, the hydraulic oil pressure outputs from the first and the second output ports $16_1$, $16_2$ are supplied via the one-way valve 24 to the accumulator chamber 22a of the accumulator $H_2$ before being accumulated therein. Thus, the pressure accumulation toward the accumulator $H_2$ is carried out by utilizing the vacuum booster 4 and the master cylinder 5 while the brake pedal is not depressed. When the accumulating force of the accumulator $H_2$ reaches the predetermined value P or greater because of the pressure accumulation, Steps S5, S6 follow Step S2 and the sub-control valve 14 is returned to the right position while the switching valve 23 is held in the right position. While the accumulator $H_2$ is in the pressure accumulated state, the relief valve 25 is opened when the accumulating force exceeds the predetermined maximum value because of a rise in temperature and the like, and the excessive pressure is released into a reservoir 5a via the master cylinder 5 to secure the durability of the accumulator $H_2$.

When the brake pedal 2 is depressed to brake the vehicle or when the electronic control unit 15 determines that it is necessary to conduct a braking operation, based on the signal which the obstacle sensor 29 outputs after detecting an obstacle in the vehicle path, Step S7 follows Step S1. After the sub-control valve 14 is switched to the left position, the switching valve 23 is moved to the left for only a predetermined time of Tmsec at Step S8. Consequently, the oil channels $17_1$, $17_2$ are shut off midway by the switching valve 23, and the path 21 communicates with the oil channels $17_1$, $17_2$ on the downstream side of the switching valve 23, whereby the accumulated oil pressure in the accumulator $H_2$ is instantly released and supplied to the wheel cylinders $18_1$, $19_1$; $18_2$, $19_2$.

Figure 3:
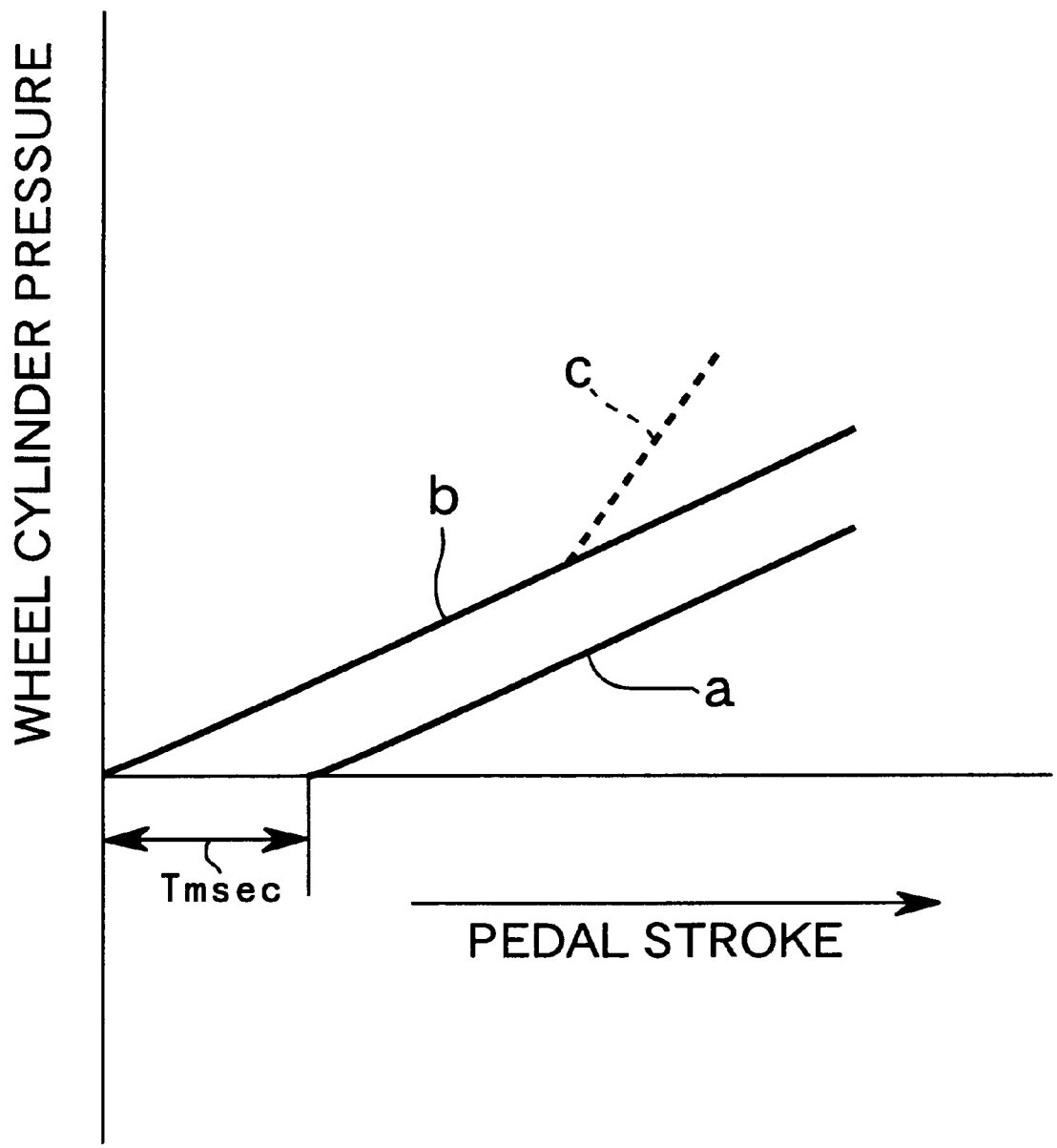
FIG. 3 is a graph showing improvement in the braking characteristics of the system according to the embodiment.

There generally occurs a delay of the predetermined time of Tmsec in the transfer of output hydraulic oil pressure from the master cylinder 5 to the wheel cylinders $18_1$, $19_1$; $18_2$, $19_2$ as shown by a line a of FIG. 3 due to the delay in the operation of the vacuum booster 4 and the master cylinder 5 at the initial stage of depressing the brake pedal 2, as noted previously. When the accumulated oil pressure in the accumulator $H_2$ is supplied to the wheel cylinders $18_1$, $19_1$; $18_2$, $19_2$ in response to the depression of the brake pedal 2 for the predetermined time of Tmsec as mentioned above, the transfer delay is compensated for as shown by a line b of FIG. 3. Thus, the response speed at the initial stage of operating the brake cylinders $18_1$, $19_1$; $18_2$, $19_2$ can be increased. As the accumulator $H_2$ has good rising characteristics at the time the accumulated oil pressure is outputted, the response speed at the initial stage of operating the brake cylinders $18_1$, $19_1$; $18_2$, $19_2$ is ensured.

In this case, the backward flow of the accumulated oil pressure toward the master cylinder 5 from the accumulator $H_2$ is checked by the one-way valve 24 on the upstream side of the accumulator $H_2$.

Subsequently at Step S9, a decision is made on whether the depressing rate of the brake pedal 2 has reached the predetermined value A or greater, that is, whether the brake operating rate switch 13 has been turned on and if the brake operating rate switch 13 is held ON, the left position of the switching valve 23 is continuously held at Step S10. Thus, not only is the response speed of the brake cylinders $18_1$, $19_1$; $18_2$, $19_2$ improved at the time of applying the brake but also the braking force is reinforced.

If it is decided that the brake operating rate switch 13 is OFF at Step S9, on the other hand, process goes to Step S11 and the switching valve 23 is moved to the right. Consequently, the emission of hydraulic oil pressure from the accumulator $H_2$ is stopped and the hydraulic oil pressure output from the master cylinder 5 is supplied to the wheel cylinders $18_1$, $19_1$; $18_2$, $19_2$ as usual, and the pressure accumulation in the accumulator $H_2$ is carried out again. When the depression of the brake pedal 2 becomes rapid in the course of depressing operation, the hydraulic oil pressure is released from the accumulator $H_2$ where it is stored under pressure and as shown by a line C of FIG. 3, the hydraulic oil pressure in the wheel cylinders $18_1$, $19_1$; $18_2$, $19_2$ is sharply raised with the effect of quickly increasing the braking force.

Figure 4:
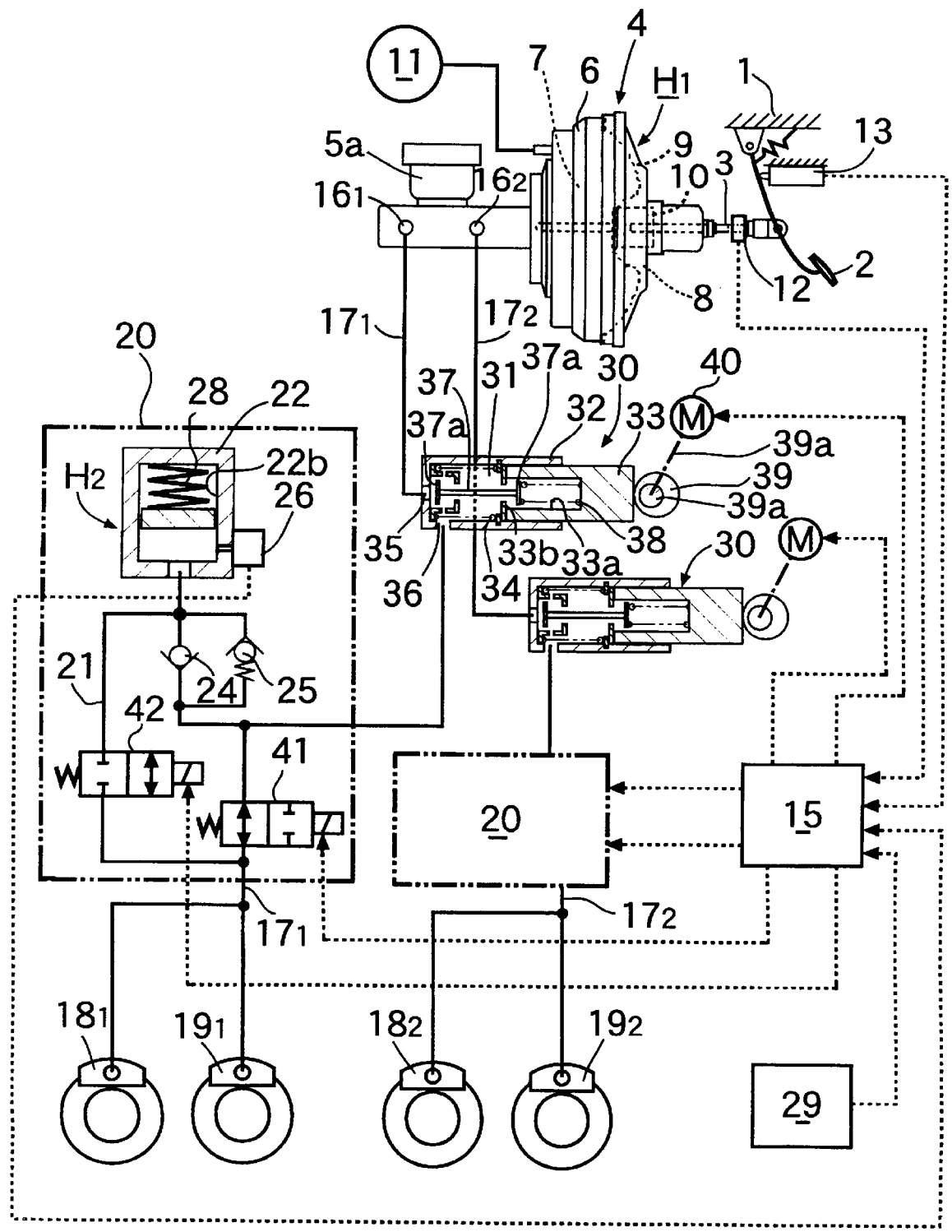
FIG. 4 is a schematic diagram of a brake system for an automobile of a second embodiment of the present invention.

Referring to FIG. 4, there is given a second embodiment of the present invention.

What makes the second embodiment of the present invention different from the first embodiment thereof is that there is an electric oil pump 30 which is actuated as an auxiliary hydraulic oil pressure supply means for the pressure accumulation in the accumulator $H_2$ at the time of automatical braking, based on the signal output from the obstacle sensor 29 or when the driver conducts the braking. More specifically, the oil pump 30 comprises a pump cylinder 32, a pump piston 33 fitted into the pump cylinder 32 to form a pump chamber 31 with respect to the end wall of the pump cylinder 32, and a return spring 34 for urging the pump piston 33 in a direction in which the volume of the pump chamber 31 is expanded. An inlet port 35 and an exhaust port 36 are provided in the end and side walls of the pump cylinder 32, respectively. Further, the upstream sides of the oil channels $17_1$, $17_2$ are connected to the inlet port 35 and the downstream sides thereof are connected to the exhaust port 36 so that the pump chamber 31 is connected by the oil channels $17_1$, $17_2$, between the master cylinder 5 and the auxiliary brake unit 20.

Further, a poppet valve 37 for opening and closing the inlet port 35 is provided in the pump chamber 31. A flange 37a slidably fitted into the hollow portion 33a of the pump piston 33, is formed on the valve lever of the poppet valve 37, and a stopper 33b for restricting the escaping of the flange 37a from the hollow portion 33a by abutting against the flange 37a, is secured to the inner end of the pump piston 33. Further, the flange 37a is urged by a valve spring 38 within the hollow portion 33a, in a direction in which it is brought into contact with the stopper 33b.

An eccentric cam 39 engages with the outer edge face of the pump piston 33 to press the pump piston 33, and an electric motor 40 is coupled to a driving shaft 39a of the eccentric cam 39. The pump piston 33 is normally held by the urging force in the retracted position where it engages with the base portion of the eccentric cam 39, when the stopper 33b supports the flange 37a of the poppet valve 37 so as to hold the poppet valve 37 in the open-valve position.

Like the sub-control valve 14 in the first embodiment of the present invention, the electric motor 40 is actuated by an output of the electronic control unit 15 based on the signals output from the brake operating switch 12, the obstacle sensor 29, the accumulator switch 26, and the like. When the eccentric cam 39 is thus rotated by operating the electric motor 40, the pump piston 33 can be reciprocated longitudinally by the cooperation of the cam with the urging force of the return spring 34. Although the poppet valve 37 initially moves forward together with the forward movement of the pump piston 33, it soon closes the inlet port 35 and stops because of the load of the valve spring 38. As the pump piston 33 moves forward, the poppet valve 37 applies pressure to and makes the pump chamber 31 generate the hydraulic oil pressure, whereby the hydraulic oil pressure can be discharged from the exhaust port 36. When the pump piston 33 is moved backward, the hydraulic oil pressure in the master cylinder 5 can be sucked into the pump chamber 31 via the inlet port 35. Thus, the operation of the oil pump 30 makes it possible to output hydraulic oil pressure from the exhaust port 36, irrespective of the depressed state of the brake pedal 2.

In each of the oil channels $17_1$, $17_2$, an electromagnetic normally open valve 41 is in its intermediate portion bypassed by the path 21, whereas an electromagnetic normally closed valve 42 is in a portion of the path 21 on the downstream side of the accumulator $H_2$.

When the oil pump 30 is actuated and the normally open valve 41 has been turned on (closed) with the normally closed valve 42 turned off (closed), the discharged hydraulic oil pressure can be supplied to the accumulator $H_2$ via the one-way valve 24 for the pressure accumulation. When the normally closed valve 42 is turned on (opened), with the pressure accumulation having been accomplished in the accumulator $H_2$, the accumulated oil pressure in the accumulator $H_2$ is released and supplied to the wheel cylinders $18_1$, $19_1$; $18_2$, $19_2$ for their activation. Since the normally open valve 41 and the normally closed valve 42 are simultaneously off, in a rest state of the oil pump 30, the output hydraulic oil pressure in the master cylinder 5 can be supplied to the wheel cylinders $18_1$, $19_1$; $18_2$, $19_2$ as usual, via the inlet port 35 of the oil pump 30, the pump chamber 31, the exhaust port 36 and the normally open valve 41 when the brake pedal 2 is depressed.

According to the second embodiment of the present invention, the first liquid pressure supply unit $H_1$ comprises the vacuum booster 4 and the master cylinder 5, or otherwise these two devices and the oil pump 30, or otherwise simply the oil pump 30.

Figure 5:
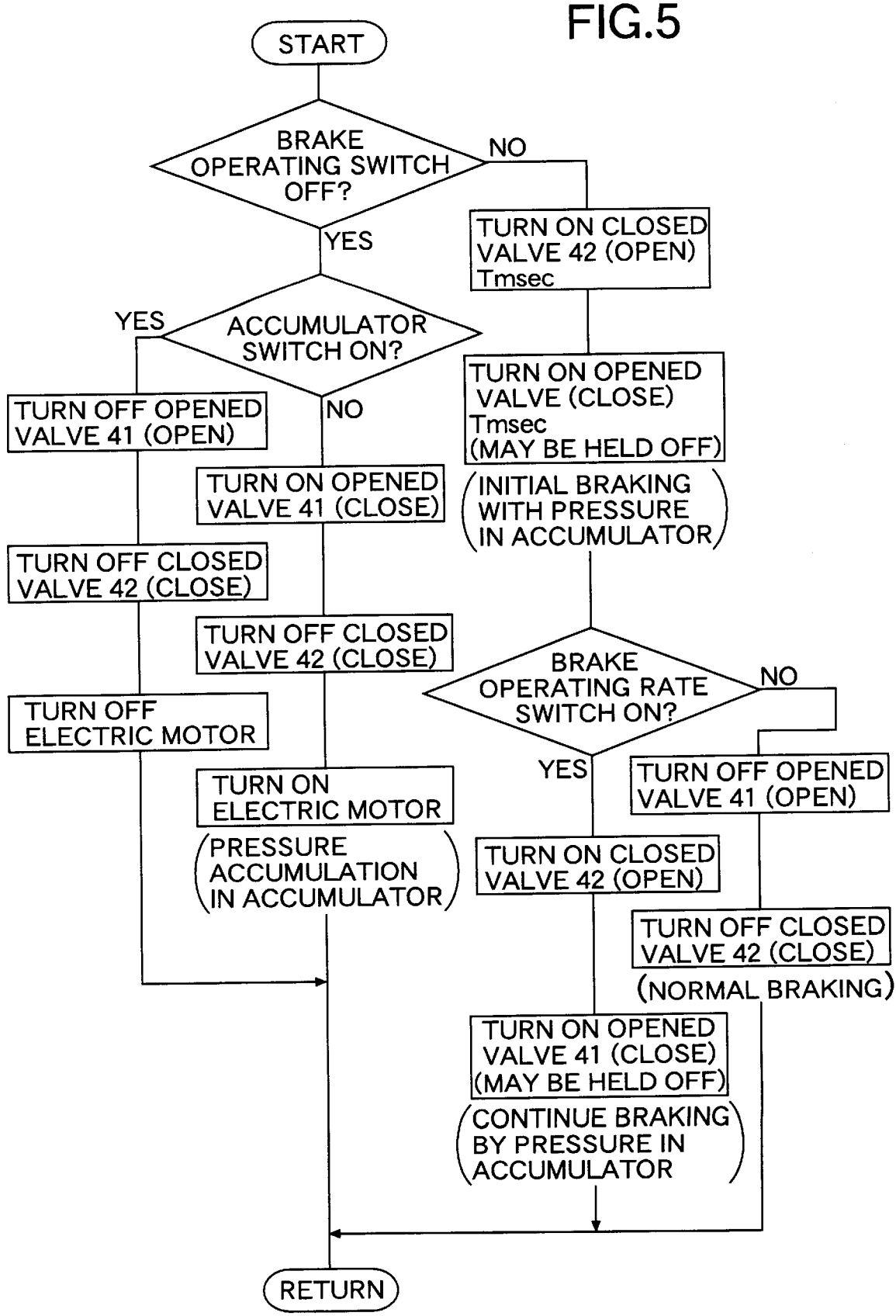
FIG. 5 is a flow chart showing procedures for controlling the brake system of FIG. 4.

The electric motor 40, the normally open valve 41 and the 15 normally closed valve 42 are controlled by the electronic control unit 15 according to the procedures shown in a flow chart of FIG. 5.

As the remaining structure is similar to what is described in the first embodiment of the present invention, like reference characters designate like corresponding component parts and the description thereof will be omitted.

As shown in the flow chart of FIG. 5, the oil pump 30 is actuated by the electric motor 40 in the undepressed state of the brake pedal 2, so that the discharge pressure accumulation in the accumulator $H_2$ can be effected. Consequently, the normally closed valve 42 is turned on (opened) at the initial stage of braking or at the time of sudden braking, to ensure that the brake is applied without delay by supplying the accumulated oil pressure to the wheel cylinders $18_1$, $19_1$; $18_2$, $19_2$. Therefore, a delay in the operation of the vacuum booster 4, the master cylinder 5, the oil pump 30 and the like is compensated for.

As the accumulator switch 26, a stroke switch may be used which is turned on when the stroke of the accumulator piston 27 toward the spring chamber 22b, reaches the predetermined value or greater.

As set forth above, according to the present invention, the brake system for a vehicle comprises the first liquid pressure supply unit for outputting liquid pressure in response to braking operation, and wheel cylinders for braking wheels when actuated with supply of the liquid pressure from the first liquid pressure supply unit. A second liquid pressure supply unit is included which provides output liquid pressure which rises quicker than that of the first liquid pressure supply unit, in order that the output liquid pressure of the second liquid pressure supply unit is selectively supplied to the wheel cylinders at the time of braking operation. Thus, the wheel cylinders can be actuated at excellent response speed, irrespective of the output delay in the liquid pressure from the first liquid pressure supply unit.

Since the second liquid pressure supply unit is arranged so that it can accumulate the output liquid pressure of the first liquid pressure supply unit as its output liquid pressure, the operation liquid pressure can be accumulated in the second liquid pressure supply unit without using a special liquid pressure pump.

Since the first liquid pressure supply unit is arranged so that it can be actuated when no braking operation is conducted and the output liquid pressure of the first liquid pressure supply unit then can be accumulated in the second liquid pressure supply unit, the operation liquid pressure can be accumulated in the second liquid pressure supply unit by utilizing the first liquid pressure supply unit with efficiency, when no braking operation is conducted.

The output liquid pressure of the second liquid pressure supply unit is supplied to the wheel cylinders at the initial stage of braking operation, whereby at the stage, the second liquid pressure supply unit automatically operates and the wheel cylinders can be actuated with excellent response speed, irrespective of the output delay in the liquid pressure from the first liquid pressure supply unit.

The output liquid pressure of the second liquid pressure supply unit is supplied to the wheel cylinders at the time of suddenly braking operation whereby at that stage, the second liquid pressure supply unit automatically operates and thus the wheel cylinders can be actuated quickly and strongly.

The valve means for selectively coupling the second liquid pressure supply unit and the wheel cylinders, are provided therebetween. The valve means are selectively actuated to ensure that the oil pressure is properly supplied to the wheel cylinders from the second liquid pressure supply unit.

Since the second liquid pressure supply unit is an accumulator, it is possible to employ a relatively inexpensive accumulator as the second liquid pressure supply unit, which can contribute to further reducing the cost for building up the system.

The present invention is not limited to each of the embodiments of the present invention but may be subjected to various design modifications without departing from the spirit of the invention.

What is claimed is:

1. A brake system for a vehicle comprising a first liquid pressure supply unit for outputting liquid pressure in response to a braking operation, and a wheel cylinder operatively coupled to the first liquid pressure supply unit for braking a vehicle wheel when actuated with liquid pressure from the first liquid pressure supply unit; and a second liquid pressure supply unit having output liquid pressure which reaches the wheel cylinder quicker than that of the first liquid pressure supply unit, operatively coupled to the wheel cylinder, wherein said second liquid pressure supply unit is an accumulator and wherein the output liquid pressure of the second liquid pressure supply unit is selectively and independently of said first liquid pressure supply unit, supplied to the wheel cylinder at the time of said braking operation.

2. A brake system for a vehicle as set forth in claim 1, wherein the accumulator is operatively coupled to the first liquid pressure supply unit such that the output liquid pressure of the first liquid pressure supply unit is accumulated as the output liquid pressure in the second liquid pressure supply unit.

3. A brake system for a vehicle as set forth in claim 2, wherein the first liquid pressure supply unit is selectively actuated when said braking operation is not conducted such that the output liquid pressure of the first liquid pressure supply unit is accumulated in the accumulator.

4. A brake system for a vehicle as set forth in claim 1, wherein the output liquid pressure of the accumulator is supplied to the wheel cylinder at an initial stage of said braking operation.

5. A brake system for a vehicle as set forth in claim 2, wherein the output liquid pressure of the accumulator is supplied to the wheel cylinder at an initial stage of said braking operation.

6. A brake system for a vehicle as set forth in claim 3, wherein the output liquid pressure of the accumulator is supplied to the wheel cylinder at an initial stage of said braking operation.

7. A brake system for a vehicle as set forth in claim 1, wherein the output liquid pressure of the accumulator is supplied to the wheel cylinder when the braking operation is conducted suddenly.

8. A brake system for a vehicle as set forth in claim 2, wherein the output liquid pressure of the accumulator is supplied to the wheel cylinder when the braking operation is conducted suddenly.

9. A brake system for a vehicle as set forth in claim 3, wherein the output liquid pressure of the accumulator is supplied to the wheel cylinder when the braking operation is conducted suddenly.

10. A brake system for a vehicle as set forth in claim 1, including valve means connected between the accumulator and the wheel cylinder, for selectively coupling the accumulator and the wheel cylinder.

11. A brake system for a vehicle as set forth in claim 2, including valve means connected between the accumulator and the wheel cylinder, for selectively coupling the liquid pressure supply unit and the wheel cylinder.

12. A brake system for a vehicle as set forth in claim 3, including valve means connected between the accumulator and the wheel cylinder, for selectively coupling the accumulator and the wheel cylinder.

* * * * *